(12) United States Patent
Bacon

(10) Patent No.: US 8,146,849 B2
(45) Date of Patent: Apr. 3, 2012

(54) CHOPPING DRUM FOR A FORAGE HARVESTER

(75) Inventor: Joshua D. Bacon, Bechhofen (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/896,103

(22) Filed: Oct. 1, 2010

(65) Prior Publication Data

US 2011/0240781 A1    Oct. 6, 2011

(30) Foreign Application Priority Data

Nov. 18, 2009  (DE) .................... 10 2009 046 808

(51) Int. Cl.
*B02C 18/18* (2006.01)
(52) U.S. Cl. ......................... 241/294; 241/242
(58) Field of Classification Search ............. 241/242, 241/243, 294
See application file for complete search history.

(56) References Cited

U.S. PATENT DOCUMENTS 1,520,068 A * 12/1924 Mitts ............................ 241/294

FOREIGN PATENT DOCUMENTS

| DE | 8813953 | 2/1969 |
| DE | 19522056 | 12/1996 |
| DE | 19918553 | 10/2000 |
| EP | 0789994 | 8/1997 |

* cited by examiner

*Primary Examiner* — Mark Rosenbaum

(57) ABSTRACT

A chopping drum for a forage harvester has a shaft. Supporting rings are mounted on the shaft one next to the other in the axial direction and extending in the radial direction. Blade holders are distributed around the outer periphery of the supporting rings, and chopping blades are mounted on the blade holders by first screws. The first screws produce a connection between blade holders one following the other in the peripheral direction.

9 Claims, 3 Drawing Sheets

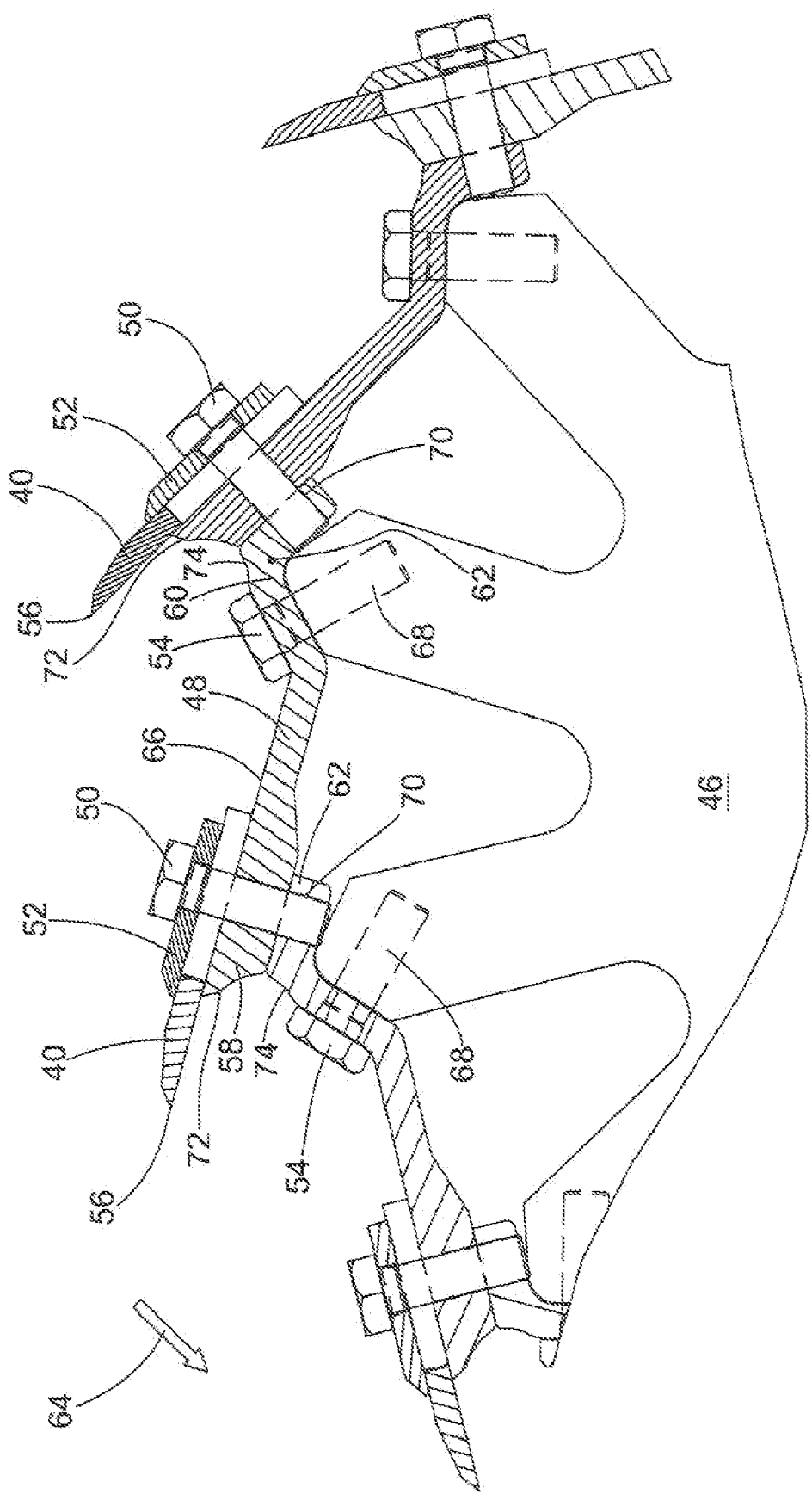

CHOPPING DRUM FOR A FORAGE HARVESTER

FIELD OF THE INVENTION

The invention relates to a chopping drum for a forage harvester. The chopping drum has a shaft with supporting rings mounted thereon one next to the other in the axial direction and extending in the radial direction. Blade holders are distributed around the outer periphery of the supporting rings, and chopping blades are mounted on the blade holders by first screws.

BACKGROUND OF THE INVENTION

Forage harvesters are used for harvesting whole plants or their parts that are taken up, during operation, from a field by means of a harvesting attachment, pressed together by pre-press rollers, and fed to a blade drum whose chopping blades cut up the plants in conjunction with a counter blade. Then the cut-up plants or plant parts are optionally fed to a secondary cutting device and conveyed by a secondary acceleration device into a discharge bend that loads it over onto a transport vehicle. The cut-up plants are typically used as fodder and/or biogas production.

In the case of a known embodiment as disclosed in German Patent Document DE 199 18 553 A1, the chopping drum comprises a drum body on which blade holders are welded, with the chopping blades being screwed, in turn, onto these holders. The drum body is connected by end plates or spokes to a central shaft that is mounted so that it can rotate and can be driven. In this way, a relatively high expense for the production of the weld connections is required between the drum body and the blade holders for them to be produced with sufficient accuracy, in order to allow low out-of-balance spinning of the chopping drum and to have to remove as little material as possible from the chopping blades when grinding the chopping blades with a grinding device. In addition, the weld connections form structural weak points that can be repaired only with difficulty or not at all in the case of wear or damage.

Furthermore, European Patent Document EP 0 789 994 A1 describes another chopping drum in which a central shaft is connected to six supporting rings extending in the radial direction. The supporting rings are equipped on their periphery with threads in which screws are inserted that extend through corresponding boreholes into the blade holders and into plates forming the drum body and fix the plates and the blade holders attached to the plates onto the supporting rings on the outside. The chopping blades are mounted on the blade holders, in turn, by other screws. Here, the cutting forces are transmitted via the blade holders to the supporting rings, so that these are to be dimensioned to be sufficiently stable.

German Patent Document DE 88 13 953 U1 describes a chopping drum in which a central shaft is connected to three supporting rings extending in the radial direction. In one embodiment, the blade holders are welded with the supporting rings, and in another embodiment, panels are welded onto the supporting rings and the blade holders are screwed in with the panels. The chopping blades are screwed in, in turn, with the blade holders. German Patent Document DE 195 22 056 A1 shows a similar arrangement, wherein, however, the blade holders simultaneously form a segmented, outer lateral surface of the chopping drum. In the case of this prior art, it is considered disadvantageous that the forces are transmitted from the blade holders to the shaft only via the supporting rings, which is why the supporting rings are to be dimensioned with sufficient stability.

SUMMARY OF THE INVENTION

The problem forming the basis of the invention is seen in providing a chopping drum improved relative to the described prior art.

A chopping drum for a forage harvester comprises a shaft with supporting rings mounted thereon one next to the other in the axial direction and extending in the radial direction. Blade holders are distributed around the outer periphery of the supporting rings, with chopping blades being mounted on these holders by means of first screws. The first screws also each extend into corresponding threads of a measurement holder adjacent to the chopping drum in the peripheral direction. The first screws thus satisfy a second task, namely the mechanical coupling of two blade holders one following the other in the peripheral direction.

In this way, the chopping drum is reinforced in the peripheral direction. Simultaneously, the modular construction with screwed blades and blade holders is preserved, which allows simple replacement when necessary.

The attachment of the blade holder to the supporting ring can be realized by a second screw that extends through a borehole or opening in the blade holder and a thread in a supporting ring (or a plate connected to this ring, see German Patent Document DE 88 13 953 U1). In the case of another embodiment, however, the first screw could also satisfy this task or the blade holders could be locked or coupled with the supporting ring just through their shape.

In the case of a preferred embodiment, the blade holders each comprise a first section that is arranged in front in the rotational direction of the chopping drum and contacts a chopping blade. The outer face of the first section is advantageously flat, in order to be able to mount a similarly flat chopping blade on this face. In the rotational direction of the chopping drum, a second section could follow the first section, with this second section comprising an opening through which the second screw screwed in with the supporting ring extends. The second section is advantageously angled outward relative to the first section by an angle of, for example, about 45°. Furthermore, a third section could follow the second section. The third section comprises a thread into which extends the first screw of the blade holder following the chopping drum in the rotational direction. The third section could be angled inward, in turn, relative to the second section.

The second section angled outward has the advantage that it forms a U-shaped pocket that is suitable, especially in interaction with a leading surface of the first section of the following blade holder inclined forward in the radial direction or relative to the radial in the rotational direction and the inner surface of the chopping blade, as a throw-shovel surface for throwing away the harvested material and offers little or no opportunity for accumulation of the harvested material.

DESCRIPTION OF THE PREFERRED EMBODIMENT

Figure 1:
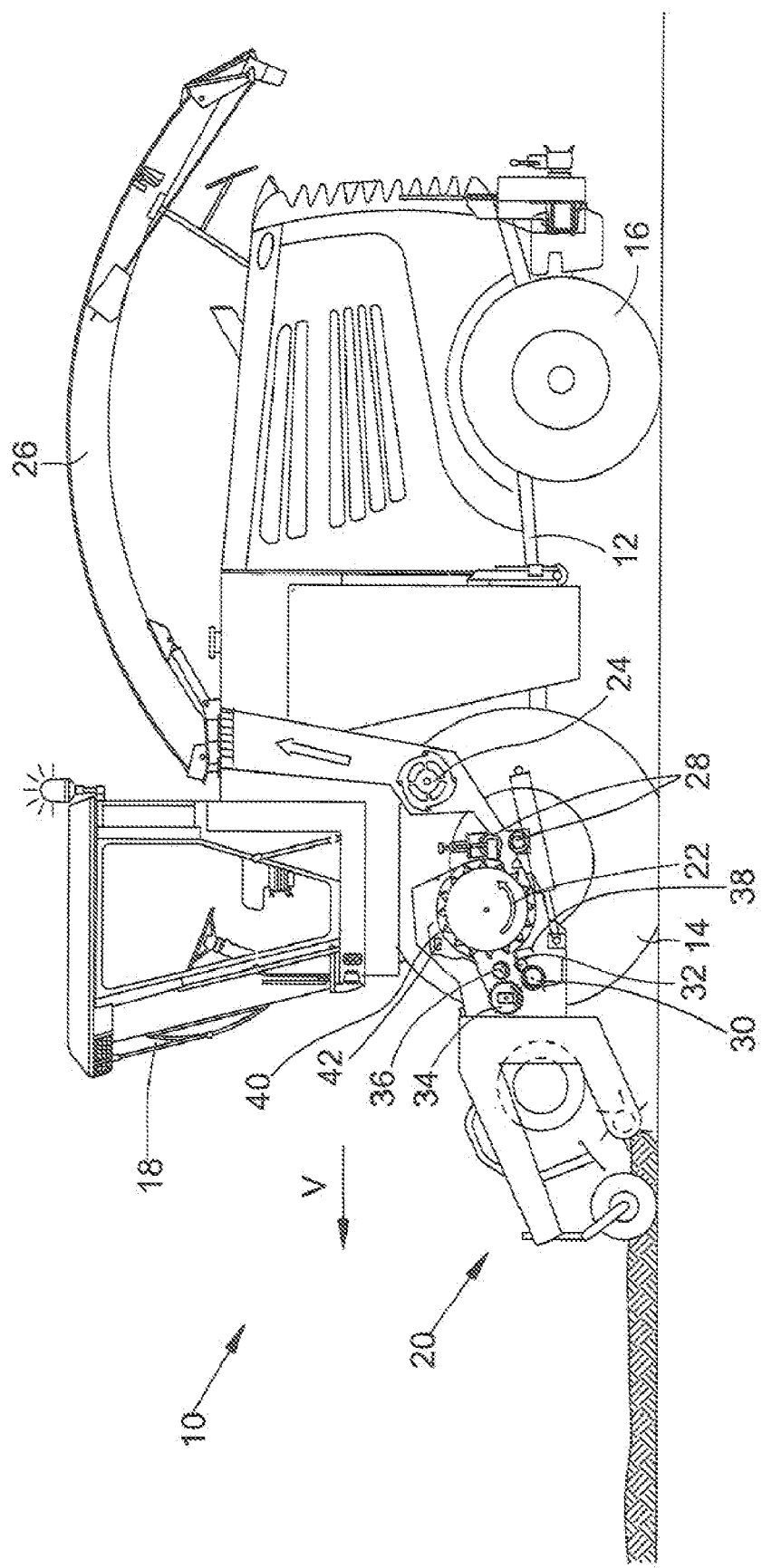
FIG. 1 is a schematic side view diagram of a forage harvester.

A self-propelled forage harvester 10 shown in FIG. 1 is mounted on a frame 12 that is supported by front and rear wheels 14 and 16. The operation of the harvesting machine 10 is performed from a driver cabin 18 from which a harvesting material pickup device 20 in the form of a pickup can be seen. Material, e.g., grass or the like, picked up from the ground by means of the harvesting material pickup device 20 is fed to a chopping drum 22 that is provided with chopping blades 40 and chops this material into small pieces in interaction with a counter blade 38 and discharges it to a feeding device 24. The material exits the harvesting machine 10 onto a trailer traveling alongside by means of a discharge chute 26 that can rotate. Between the chopping drum 22 and the feeding device 24, there is a secondary cutting device 28 by which the material to be fed is fed tangentially to the feeding device 24. Between the harvesting material pickup device 20 and the chopping drum 22, the material is transported through bottom prepress rollers 30, 32 and top prepress rollers 34, 36. The chopping blades 40 can be sharpened by means of a grinding device 42.

Figure 2:
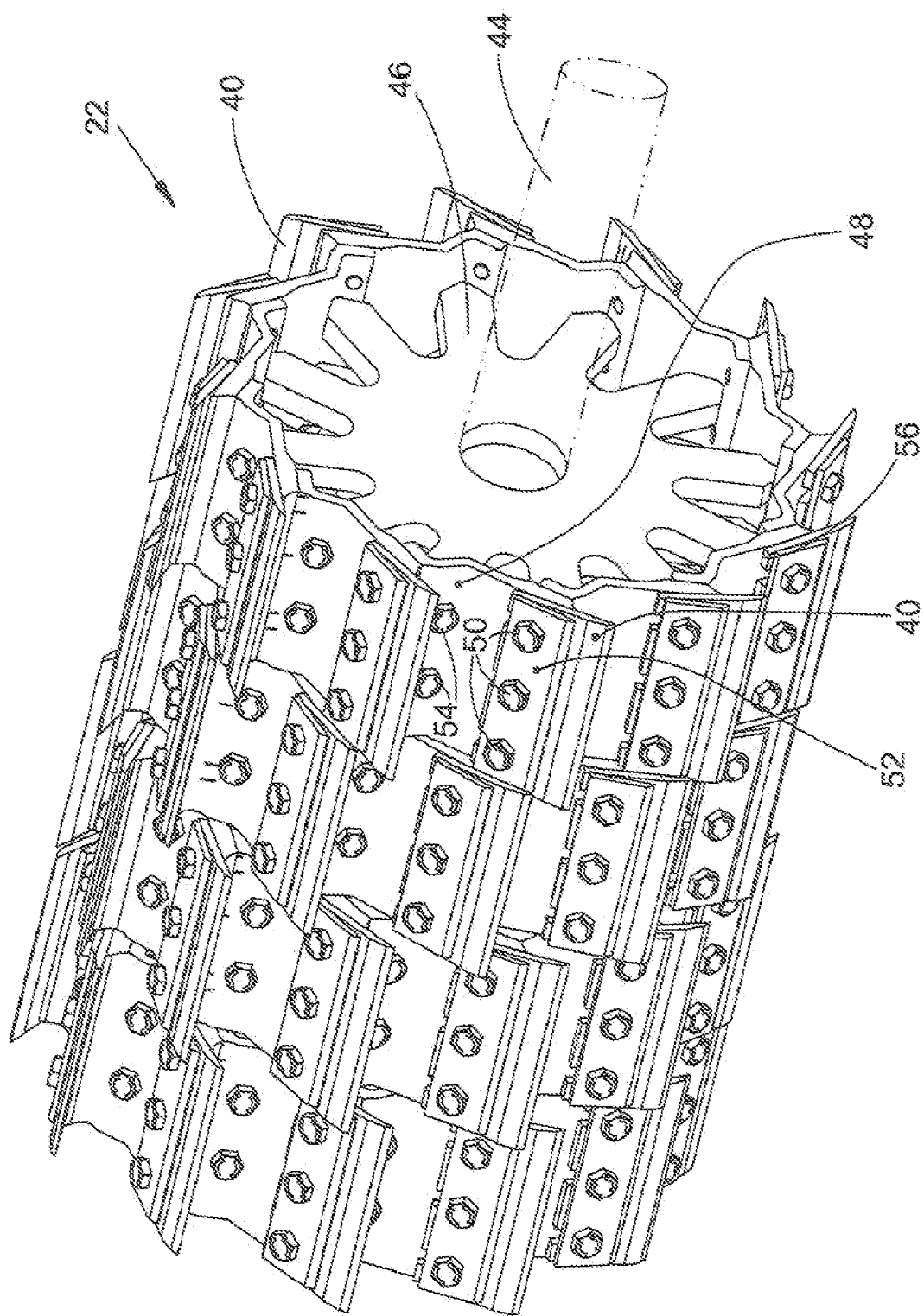
FIG. 2 is a perspective view of the chopping drum of the forage harvester of FIG. 1; and, FIG. 3 is an enlarged section view of the chopping blade, blade holder, and a supporting ring of the chopping drum.

In FIG. 2, a perspective view of the chopping drum 22 is shown. It comprises a continuous shaft 44 on which, in the axial direction of the shaft 44, a number of supporting rings 46 extending in the radial direction to the shaft 44 are mounted one next to the other. Blade holders 48 are distributed around the outer periphery of the supporting rings 46, with the individual chopping blades 40 being mounted, in turn, on these holders by first screws 50 (three in the illustrated embodiment). Between the heads of the screws 50 and the chopping blades 40 there are pressure plates 52. As shown in FIG. 2, two supporting rings 46 can be allocated to the blade holders 40 and chopping blades 48 one following each other in the peripheral direction. In the case of the illustrated embodiment, every twelve chopping blades 40 and twelve blade holders 48 form a ring around the chopping drum 22, and there are, overall, four rings. Each blade holder 40 is screwed in by a second screw 54 to two supporting rings 46. However, for each ring only one supporting ring 46 could also be provided or three or four or more supporting rings 46.

The cutting edges 56 of all of the chopping blades could run (especially for grass harvesting) parallel to the shaft 44, as drawn, or at an angle to this shaft (for corn harvesting).

FIG. 3 shows an enlarged section through the chopping drum 22. The blade holders 48 each comprise three sections 58, 60, and 62. The first section 58 lies forward in the rotational direction of the chopping drum 22, as is indicated by the arrow 64, and runs in a counterclockwise direction, and has a flat, outer face 66 that is inclined backward and inward relative to a tangent contacting the periphery of the chopping drum 22. The chopping blade 40 with a flat construction contacts the face 66. The area of the first section 58 located under the chopping blade 40 and the pressure plate 52 is thicker than the following regions of the blade holder 48. The second section 60 that is angled backward and outward connects to the first section 58. Through an opening or borehole in the second section 60 extends the shaft of the second screw 54 that engages in a thread 68 formed on the outside in the supporting ring 46 (or connected to this ring). Finally, the third section 62 that is angled inward relative to the second section 60 by approximately 90° connects to the second section 60. The third section 62 comprises a threaded borehole 70 in which the shaft of the first screw 50 engages. The shaft of the first screw 50 consequently extends through a pressure plate 52, a first section 58 of a blade holder 48, and a third section 62 of the adjacent blade holder 48 leading in the rotational direction of the chopping drum 22. Consequently, the blade holders 48, one following the other in the peripheral direction, are connected mechanically to each other by the first screw 50, which reinforces the chopping drum 22 in the peripheral direction.

The leading surface 72 of the first section 58 is oriented inclined forward relative to the radial in the rotational direction and forms, with the leading surface 74 of the second section and also the inside of the chopping blade 40, a relatively smooth, U-shaped pocket in which only little harvested material residue can accumulate and simplifies the throwing away of the harvested material residue contained in the pocket.

Additional advantages of the chopping drum 22 lie in that there are no weld connections that can form weak points and that all of the individual parts, in particular, the blade holders 48, can be easily replaced when needed.

Having described the preferred embodiment, it will become apparent that various modifications can be made without departing from the scope of the invention as defined in the accompanying claims.

The invention claimed is:

1. A chopping drum for a forage harvester, the chopping drum comprising:
   a shaft with supporting rings mounted thereon one next to the other in the axial direction and extending in the radial direction;
   a plurality of blade holders distributed around the outer periphery of the supporting rings; and,
   a plurality of chopping blades mounted on the plurality of blade holders by first screws;
   wherein the first screws also produce a connection between a one of the plurality of blade holders and an additional one of the plurality of blade holders one following the other in the peripheral direction.

2. A chopping drum according to claim 1, wherein the blade holders are each mounted on a supporting ring by a second screw.

3. A chopping drum according to claim 1, wherein the blade holders have a first section that is arranged in front in the rotational direction of the chopping drum and each of which contacts a chopping blade.

4. A chopping drum according to claim 3, wherein the blade holders have a second section that follows the first section in the rotational direction of the chopping drum and comprises an opening through which a second screw extends that is screwed with the supporting ring.

5. A chopping drum according to claim 4, wherein the second section is angled outward relative to the first section.

6. A chopping drum according to claim 4, wherein the blade holders have a third section that follows the second section in the rotational direction of the chopping drum and comprises a thread into which a first screw of the blade holder following the chopping drum in the rotational direction extends.

7. A chopping drum according to claim 6, wherein the third section is angled inward relative to the second section.

8. A chopping drum according to claim 3, wherein the leading face of the first section is oriented inclined forward relative to the radial in the rotational direction.

9. A chopping drum according to claim 1, wherein two adjacent supporting rings are allocated to each ring formed by a number of blade holders one following the other in the peripheral direction.

\* \* \* \* \*